Inventor
George Henry Walker.

Attorney

May 19, 1942.  G. H. WALKER  2,283,244
MEANS FOR THE EXTRACTION OF AIR FROM THE CIRCULATING
WATER OF HYDRAULIC BRAKES OR DYNAMOMETERS
Filed Oct. 18, 1939  3 Sheets—Sheet 3

Inventor
George Henry Walker.
by J. Ogden O'Brien
Attorney

Patented May 19, 1942

2,283,244

UNITED STATES PATENT OFFICE 2,283,244

MEANS FOR THE EXTRACTION OF AIR FROM THE CIRCULATING WATER OF HYDRAULIC BRAKES OR DYNAMOMETERS

George Henry Walker, Worcester, England, assignor to Heenan & Froude Limited, Worcester, England Application October 18, 1939, Serial No. 300,092
In France August 18, 1939

1 Claim. (Cl. 265—24)

This invention relates to improvements in hydraulic brakes and dynamometers of the type in which a vaned element mounted on a rotary shaft circulates water or other suitable liquid to and from a similar vaned element which is fixed in the casing of the apparatus.

In apparatus of this type having the power absorption regulated by sluice gates it is well known that when they are employed for testing or other purposes involving the destruction of considerable amounts of power, the relative velocity between the water and the apparatus is sufficiently high to endanger the life of the working parts by erosion or by erosion-corrosion and the rate of erosion in parts liable to be attached is due to the presence of air or gases suspended or entrapped in the water. In practice water always contains a greater or less proportion of air, and it is difficult to avoid the concentration of air at the vulnerable points and thereby reduce or prevent damage to the material of which the apparatus is constructed.

The object of the present invention is the provision of means for automatically extracting air from the regions of the apparatus where it has been found by experience that air might be expected to collect under working conditions and these means comprise holes, passages or tubes formed or arranged in or near the vulnerable parts of the vanes of the rotating and the non-rotating elements.

The invention is illustrated in the accompanying drawings and will be described with relation thereto. In these drawings.

Figure 6:
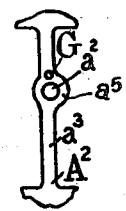
Fig. 6 is a view looking in the direction of the arrow 6 shown in Fig. 4.
Figure 5:
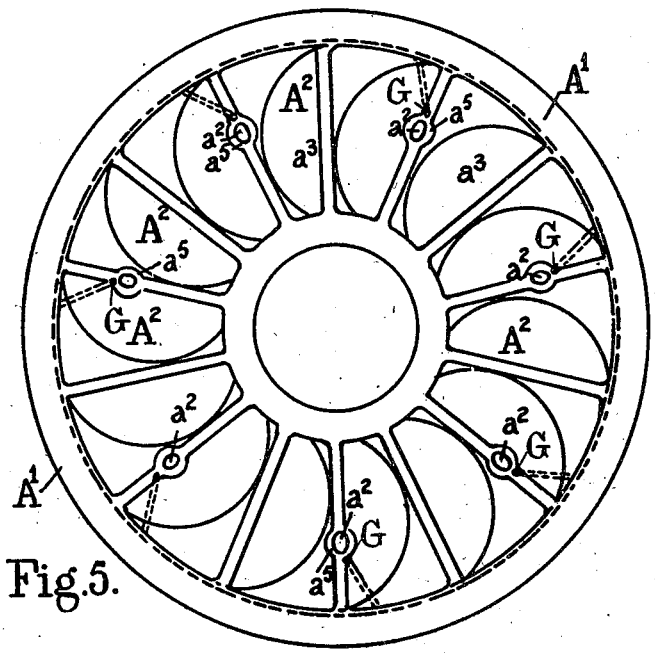
Fig. 5 is a face view of the vaned element affixed to the casing.

The hydraulic dynamometer is of the usual type with a casing A to which is affixed the liners $A^1$ in which the non-rotating vaned elements $A^2$ are formed and a rotating shaft B to which is affixed the rotor $B^1$ carrying the rotary vaned elements $B^2$. The casing A is mounted so as to be capable of a slight oscillating movement and is connected to the measuring and weighing apparatus C by the arm $C^1$. The water or other liquid is supplied through the inlets $a$ connected to the annular space $a^1$ and passes to the co-acting vaned elements $A^2$, $B^2$ through channels $a^2$ in the vanes $a^3$ of the member $A^2$. The channels $a^2$ are formed in alternate vanes $a^3$ which are enlarged at $a^5$ as shown in Figs. 5 and 6 to receive the channels. The water or liquid leaves the elements $A^2$, $B^2$, at the circumferential edge $b^2$ from which it passes to the annular chamber $b^1$ connected to the outlet $b$. The power which the dynamometer is capable of absorbing is regulated by the sluice gates D which slide between the two vaned elements $A^2$ and $B^2$, the screws $d$ by which they are operated being geared together so that the two gates will be moved in or out in unison by a single operating handle.

The circulating water enters the working compartment of the apparatus at a point where under working conditions pressure is low. Although this pressure is low, it is usually subject to a pressure of water which is higher than atmospheric and the pressure of the water in the working compartment near the periphery of the rotating element is still higher due to the increment of pressure added to the water by the rotation.

As is well known the shape of the pockets formed by the vanes $a^3b^3$ of the two vaned elements $A^2B^2$ is such as to create in each pocket a vortex having an axis of rotation which coincides with the point of lowest pressure, and it is at this point that any air suspended or entrapped in the circulating water tends to collect since in spite of the turbulent conditions which exist in the working compartment the air being lighter than water tends to remain at the centre of the vortex. Nevertheless, owing to the violent state of turbulence which exists air does become entangled in the water to a greater or less extent and promotes erosion of the material against which the water impinges.

Furthermore in this type of dynamometer the pockets of the power absorbing elements remain filled with water under all conditions of load and speed, and there exists at all times in the vicinity of the centre of each vortex a pressure due to the pressure of the incoming water supply to which this point is connected by holes or equivalent passages formed in the vanes $a^3$ of the nonrotating element $A^2$ as previously described.

Figure 1:
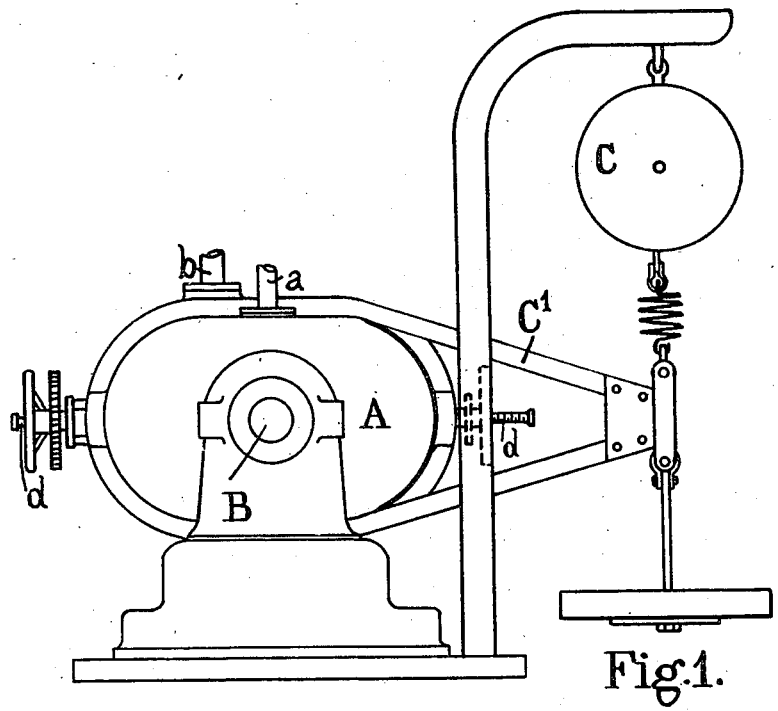
Fig. 1 is a side view of a hydraulic dynamometer.
Figure 3:
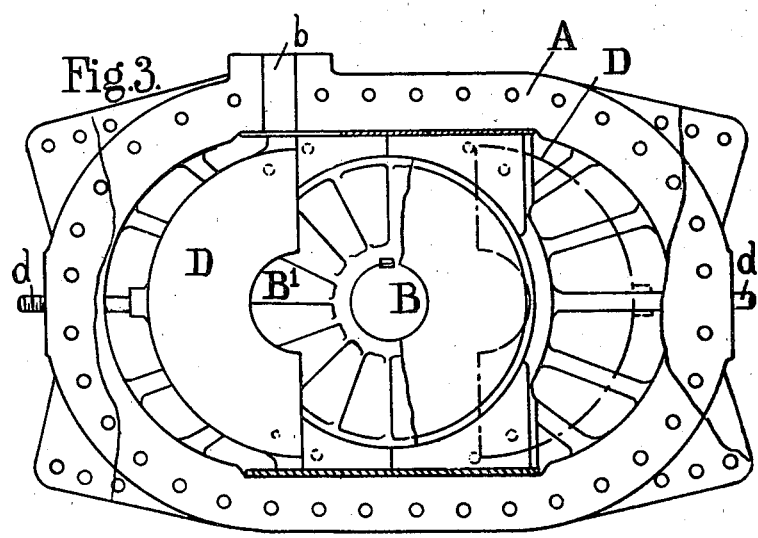
Fig. 3 is a section on line 3—3 Fig. 2 showing the sluice gates, which control the power of the apparatus in their open position.
Figure 2:
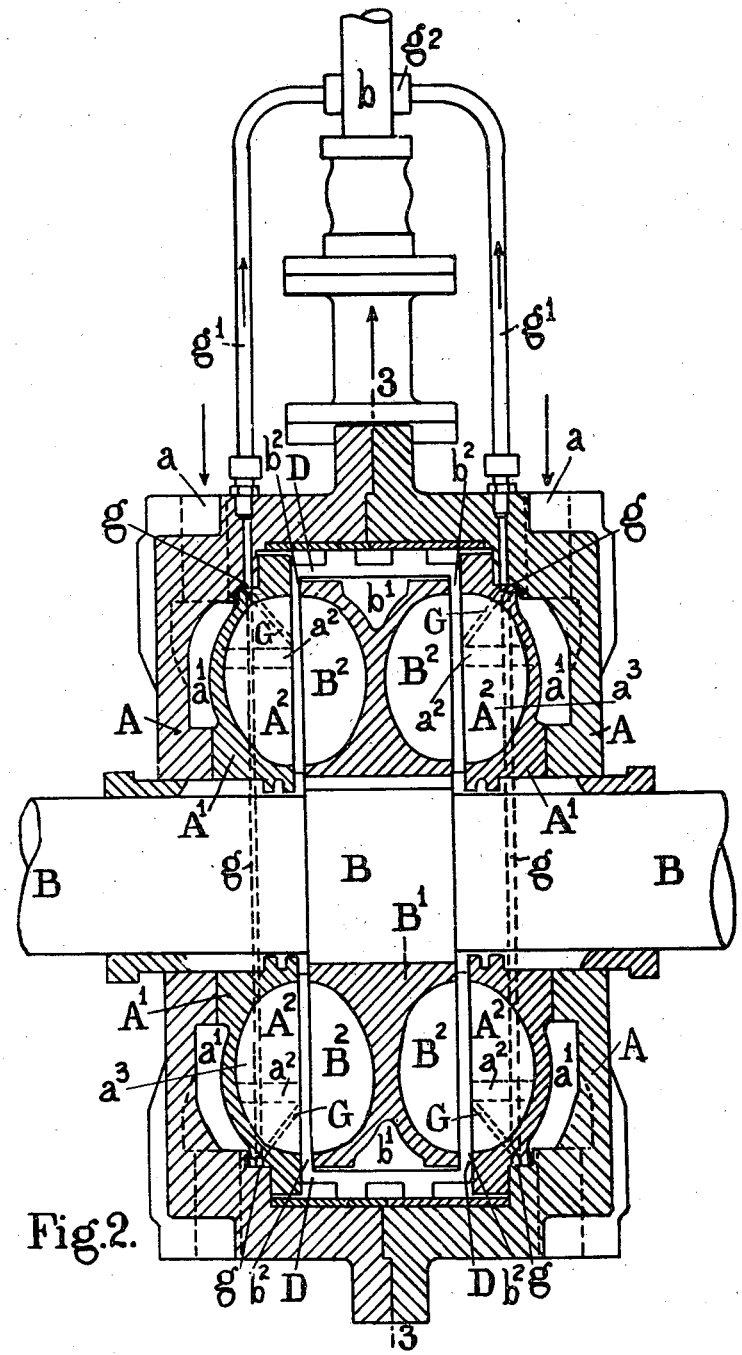
Fig. 2 is a transverse section thereof.
Figure 4:
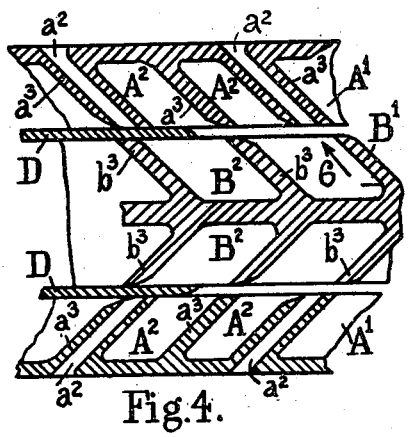
Fig. 4 is a developed section of part of the rotating and non-rotating elements.

In order to provide means for extracting the air from a point approximating to the centre of each vortex further holes or passages G (see Figs. 2, 5 and 6), are formed in the vanes $a^3$ to put all the points into communication with an annular groove $g$ (Figs. 2 and 5) in the casing which is connected by the pipe $g'$ to a point $g^2$ in the water outlet piping $b$. Such point may conveniently correspond with the drainage system or alternately with the exit side of the outlet valve or its equivalent which is normally provided for restricting the flow of water out of the working compartment. Through these additional passages G, since the internal pressure under working conditions invariably exceeds the external, water will continue to flow carrying away with it any entrapped air from the power-absorbing elements $A^2B^2$.

What I claim as my invention and desire to protect by Letters Patent is:

A hydraulic dynamometer comprising the combination with a rotating element, a non-rotating element reacting therewith, a casing to which the non-rotating element is affixed, an arm affixed to said casing, weighing apparatus controlled by said arm, a water inlet pipe, a water outlet pipe and sluice gates controlling the supply of water to the apparatus, of vanes in the rotating element dividing it into a number of pockets, vanes in the non-rotating element dividing it into a number of pockets always filled with water, passageways in the vanes of the non-rotating element opening at one end of the centres of the vortices set up in the said pockets, an annular groove in the casing into which the other ends of the passage ways open and a pipe connecting the annular groove to the water outlet pipe where the pressure is lower than at the centres of the vortices whereby any air suspended or entrapped in the circulating water will escape and erosion is prevented.

GEORGE HENRY WALKER.